Patented Dec. 9, 1924.

1,518,847

UNITED STATES PATENT OFFICE.

WILHELM HERZBERG, OF BERLIN-WILMERSDORF, AND OSWALD SCHARFENBERG, OF BERLIN-SCHONEBERG, GERMANY, ASSIGNORS TO ACTIEN GESELLSCHAFT FÜR ANILIN FABRIKATION, OF BERLIN, GERMANY.

NEW DYE FOR WOOL OF THE SAFRANINE SERIES.

No Drawing.    Application filed November 20, 1923.   Serial No. 675,920.

*To all whom it may concern:*

Be it known that we, WILHELM HERZBERG and OSWALD SCHARFENBERG, citizens of the German Republic, residing at Berlin-Wilmersdorf, Germany, and Berlin-Schoneberg, Germany, have invented certain new and useful Improvements in New Dyes for Wool of the Safranine Series, of which the following is a specification.

A method of manufacturing dyestuffs of the safranine series consisting in treating an iso-rosinduline in the presence of oxygen or an oxidizing agent with ammonia or with a primary amine is well-known (see German specifications Nos. 97118, 97365, 97395, 97396 and 102362).

In the German specification No. 97396 it is stated that substituted iso-rosindulines, for example suphonic acids, may be used. According to the present invention, if in the benzene nucleus the hydrogen atom adjacent to the nitrogen of the azine nucleus which is combined with two aryl groups is exchanged for the sulphonic group new valuable dyes are obtained. These dyestuffs having more sulphonic acid groups in any position are unknown up to the present; they are very fast to light and of particularly good levelling power.

The iso-rosindulines which serve as parent material are manufactured in the known manner, for example by the condensation of a tertiary aromatic amine containing in the 4-position an amino- and in the 3-position a sulphonic group, with a 2-arylaminonaphthalene, with a derivative thereof etc.

The following examples illustrate the invention, the parts being by weight:

*Example 1.*—Into a solution heated to 85–90° C. made from 400 parts of water, 30 parts of 3-sulphophenyl-2-naphthylamine (which may be obtained by boiling a mixture of 2-oxynaphthlene and 1-aminobenzene-3-sulphonic acid with sodium bisulphite lye) and 22 parts of 1-dimethylamino-4-aminobenzene-3-sulphonic acid (obtained by reducing the dyestuff derived from any diazo-compound and 1-dimethylamino-3-sulphonic acid) there is allowed to run a solution of 30 parts of sodium bichromate in 60 parts of water, 125 parts of acetic acid of 30 per cent strength being added. The iso-rosindulinedisulphonic acid thus obtained crystallizes partly after cooling. It dissolves in concentrated sulphuric acid to a reddish violet solution.

For the manufacture of the safranine it is not necessary to separate the intermediate product. After oxidation the solution is allowed to run into a solution of 19 parts of 1.4-diaminobenzene-2-sulphonic acid in 200 parts of water, 90 parts of sodium hydroxide solution of 40° Baumé specific gravity and 50 parts of crystallized sodium sulphite being added. A current of air is blown through the solution, until a sample of the isolated safranine dissolves to a clear green solution in concentrated sulphuric acid. By addition of 20 parts of sodium bicarbonate the excess of sodium hydroxide is neutralized; the solution is then filtered from the chromium hydroxide which has separated. From the filtrate the safranine is precipitated by addition of common salt. It dyes wool clear blue tints.

Many variations may be made in the example without departing from the scope of the invention described as above.

Firstly for the 3-sulphophenyl-2-naphthylamine there may be substituted 4-sulphophenyl-2-naphthylamine manufactured in the described manner starting from 2-oxynaphthalene and 1-aminophenyl-4-sulphonic acid; other derivatives of phenyl-2-napthylamine containing another substituent, such as halogen, may be employed. Instead of 1-dimethylamino-4-aminobenzene-3-sulphonic acid another suitable sulphonic acid of a tertiary para-diamine may be used, for instance the corresponding diethyl compound, 4-amino-ethyl-4'-sulphobenzylaniline-3-sulphonic acid etc.

Furthermore for the 1.4-diaminobenzene-2-sulphonic acid serving in the example as the third component, that is for converting the iso-rosindulinesulphonic acid into the corresponding safranine, there may be substituted another suitable sulphonic acid of an aromatic para-diamine, a non-sulphonated aromatic para-diamine etc.

*Example 2.*—The iso-rosindulinedisulphonic acid prepared from 30 parts of 2-phenylaminonaphthalene-6-sulphonic acid and 24.5 parts of 1-diethyl-15-amino-4-amino-benzene-3-sulphonic acid is converted into the safranine disulphonic acid by treating with 30 parts of 1-para-toluenesulphamino-4-amino-2-chlorobenzene and an oxidizing agent and by eliminating the acidyl group. The dyestuff thus obtained dyes wool in an acid bath greenish blue tints; it forms in the state of its sodium salt a dark powder showing metallic lustre, dissolving in concentrated sulphuric acid to a greenish solution. The blue aqueous solution becomes more reddish by addition of sodium carbonate and reddish violet by addition of sodium hydroxide solution.

*Example 3.*—43 parts of the iso-rosinduline sulphonic acid (described in Example 5 of the German specification No. 97396) are converted with aid of 30 parts of 1-para-toluenesulphamino-4-amino-2-chlorobenzene by the oxidizing process described in Example 1 into the corresponding safranine. To sulphonate the safraninemonosulphonic acid and to eliminate the acidyl group it is heated to 50–60° C. with fuming sulphuric acid containing 25 per cent of anhydride until a sample separated by water dissolves in a solution of sodium carbonate. The dyestuff is finished in the usual manner. It shows as well the dyestuff described in Example 1 the like properties of the dyestuff of Example 2.

For the parent materials used in Examples 2 and 3 others may be substituted in the same manner as described in Example 1.

Finally as to the several steps of the process according to the invention for the two oxidation processes (forming the iso-rosinduline sulphonic acid and then the safranine) any other suitable oxidizing process than that given in the examples may be used.

Having now described our invention what we claim is.—

1. The herein-described new dyes for wool of the safranine series, being in the state of their sodium salts dark powders with a metallic lustre, dissolving in concentrated sulphuric acid to greenish solutions and in water to blue solutions which become more reddish by addition of sodium carbonate and reddish violet by addition of sodium hydroxide solution, dyeing on wool in an acid bath blue tints, containing at least two sulphonic acid groups and derived from the safranines which correspond as free acids to the general formula:

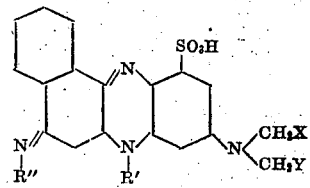

X and Y meaning univalent radicals, R' an aromatic radical, R" a 4-substituted radical of the benzene series.

2. The herein-described new dyes for wool of the safranine series being in the state of their sodium salts dark powders with a metallic lustre, dissolving in concentrated sulphuric acid to greenish solutions and in water to blue solutions which become more reddish by addition of sodium carbonate and reddish violet by addition of sodium hydroxide solution dyeing on wool in an acid bath blue tints containing at least two sulphonic acid groups and derived from the safranines which correspond as free acids to the general formula:

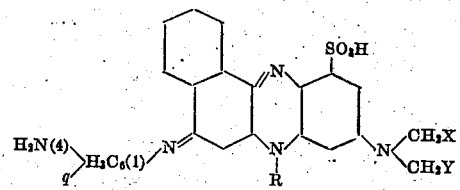

$q$, X, Y meaning univalent radicals, R meaning an aromatic radical.

3. The herein-described new dyes for wool of the safranine series being in the state of their sodium salts dark powders with a metallic lustre, dissolving in concentrated sulphuric acid to greenish solutions and in water to blue solutions which become more reddish by addition of sodium carbonate and reddish violet by addition of sodium hydroxide solution dyeing on wool in an acid bath blue tints, containing at least two sulphonic acid groups and derived from the safranines which correspond as free acids to the general formula:

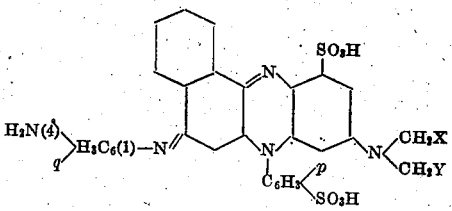

$p$, $q$, X, Y meaning univalent radicals.

4. The herein-described new dyes for wool of the safranine series being in the state of their sodium salts dark powders with a metallic lustre, dissolving in concentrated sulphuric acid to greenish solutions and in water to blue solutions which become more reddish by addition of sodium carbonate and reddish violet by addition of sodium hydroxide solution, dyeing on wool in an acid bath blue tints containing at least two sulphonic groups and derived from the safranines which correspond as free acids to the general formula:

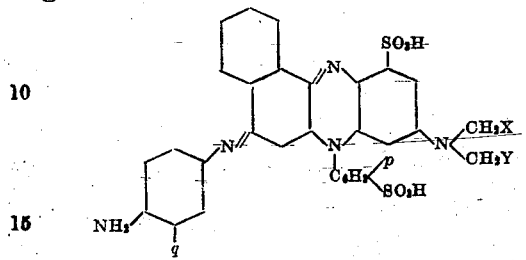

$p, q$, X, Y meaning univalent radicals.

5. The herein-described new dyes for wool of the safranine series being in the state of their sodium salts dark powders with a metallic lustre, dissolving in concentrated sulphuric acid to greenish solutions and in water to blue solutions which become more reddish by addition of sodium carbonate and reddish violet by addition of sodium hydroxide solution, dyeing on wool in an acid bath blue tints, containing at least two sulphonic groups and derived from the safranines which correspond as free acids to the general formula:

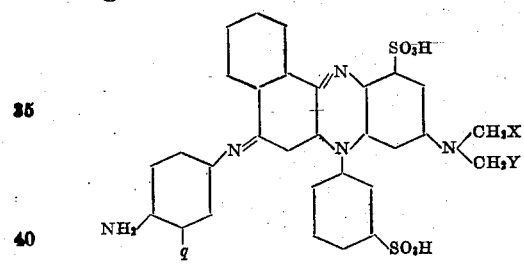

$q$, X, Y meaning univalent radicals.

6. The herein-described new dyes for wool of the safranine series being in the state of their sodium salts dark powders with a metallic lustre, dissolving in concentrated sulphuric acid to greenish solutions and in water to blue solutions which become more reddish by addition of sodium carbonate and reddish violet by addition of sodium hydroxide solution, dyeing on wool in an acid bath blue tints containing two sulphonic groups and derived from the safranines which correspond as free acids to the general formula:

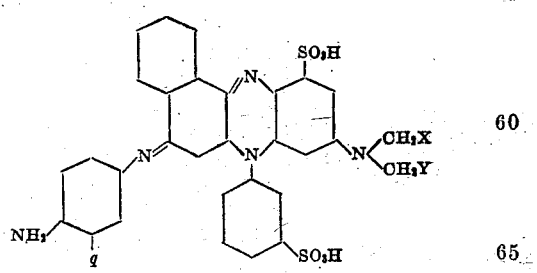

$q$, X, Y meaning univalent radicals.

7. The herein-described new dye for wool of the safranine series being in the state of its sodium salt a dark powder with a metallic lustre, dissolving in concentrated sulphuric acid to a greenish solution and in water to a blue solution which becomes more reddish by addition of sodium carbonate and reddish violet by addition of sodium hydroxide solution, dyeing on wool in an acid bath blue tints and corresponding as free acid to the general formula:

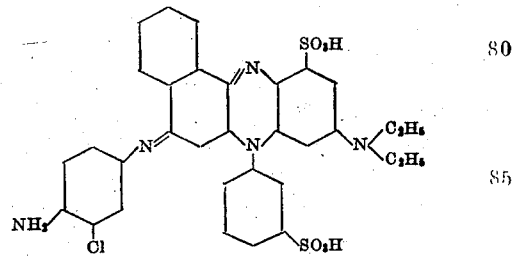

In testimony whereof we affix our signatures in presence of two witnesses.

WILHELM HERZBERG.
OSWALD SCHARFENBERG.

Witnesses:
E. KLIPPEL,
E. HOLTZERMON.